United States Patent [19]

Manna

[11] 4,320,813
[45] Mar. 23, 1982

[54] DIFFERENTIAL LOCK CONTROL

[75] Inventor: Albert Manna, Aurora, Ill.

[73] Assignee: Caterpillar Tractor Co., Peoria, Ill.

[21] Appl. No.: 140,384

[22] PCT Filed: Dec. 10, 1979

[86] PCT No.: PCT/US79/01090
  § 371 Date: Dec. 10, 1979
  § 102(e) Date: Dec. 10, 1979

[51] Int. Cl.³ .............................................. B60K 17/34
[52] U.S. Cl. ..................................... 180/249; 414/699
[58] Field of Search ..................... 180/249, 250, 24.02;
                                                          414/699

[56]  References Cited
U.S. PATENT DOCUMENTS 2,864,454 12/1958 Labelle ............................. 180/24.02
3,484,009 12/1969 Barbee ................................. 180/249
3,627,072 12/1971 Smirl .................................... 180/249
3,782,572 1/1974 Gautier ................................ 414/699

Primary Examiner—John P. Silverstrim
Attorney, Agent, or Firm—Wegner, Stellman, McCord, Wiles & Wood

[57] ABSTRACT

A control (51, 151) for automatically effecting a lock-out of an interaxle differential (14) of a wheeled vehicle (10). The control is arranged to sense a deflection of one of the axles (22) of the wheeled vehicle utilizing a springy beam (24, 124) mounting for transmitting a sensible signal through interconnecting structure (36, 136, 38, 50) from the deflectable beam to the lock-out lever (37) of the interaxle differential (14). In one form, the beam is made to be springy by being provided with a tapered end portion (32) connected through the linkage (36) and in another form, the beam connection to the linkage (136) is through a leaf spring (152). A stop (155) may be provided for limiting the deflection of the axle being sensed.

21 Claims, 5 Drawing Figures

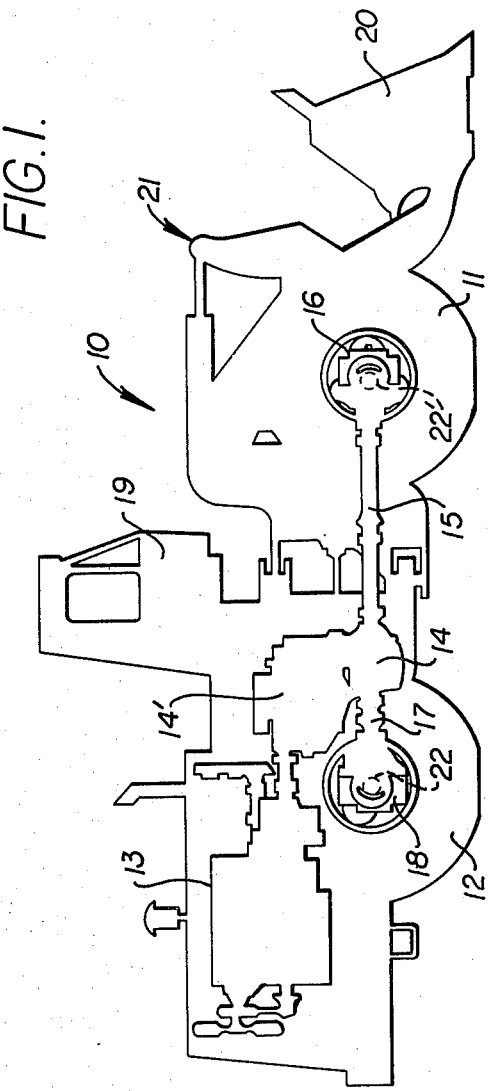
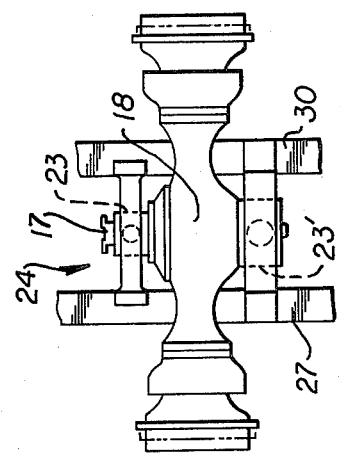

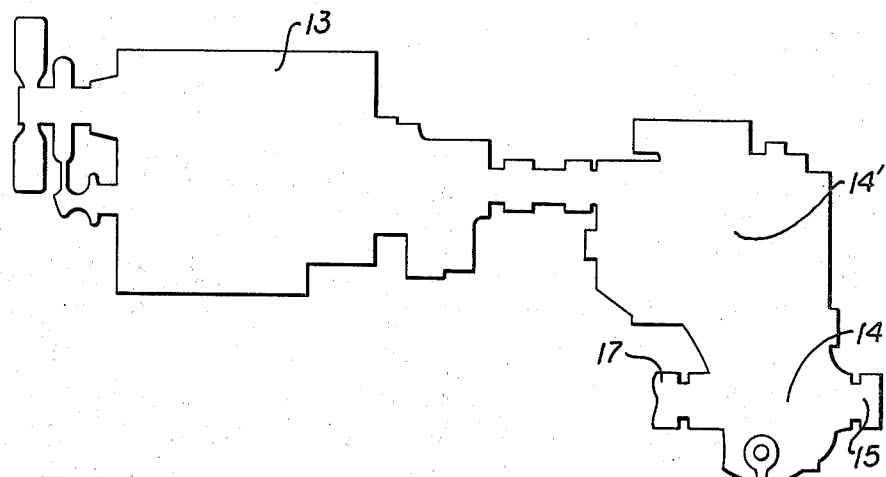
FIG.3.
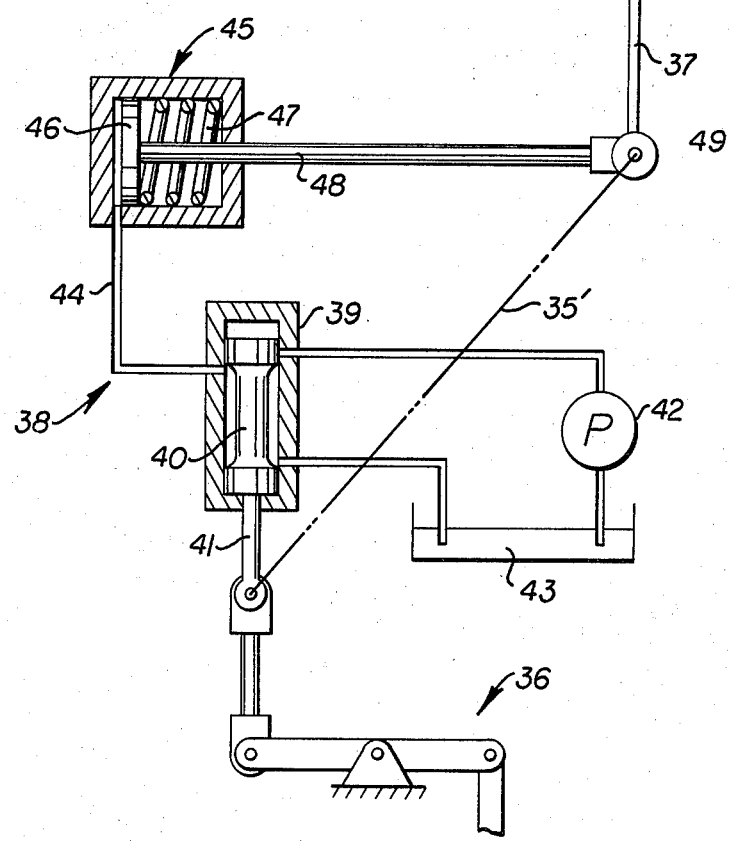

4,320,813

DIFFERENTIAL LOCK CONTROL

TECHNICAL FIELD

This invention relates to vehicle drives and in particular, to means for controlling the operation of a vehicle differential.

BACKGROUND ART

In one form of vehicle drive such as for use in a wheeled loader, an interaxle differential is provided for delivering drive power to a front wheel axle and to a rear wheel axle, each of which may be further provided with their own differential mechanism, when conditions are such that the wheels of one of the axles lose traction.

The use of such an interaxle differential requires means for locking that differential at times. Heretofore, control means have been provided for use by the operator of the vehicle to effect such locking operation. However, the operator may fail to release the locked differential, when not needed, causing undue wear and/or early fatigue failure of certain components of the drive system.

DISCLOSURE OF INVENTION

In one aspect of the present invention, an improved vehicle drive structure has means responsive to a difference in the load supplied to two different axles connected by an interaxle differential for automatically locking the differential when the load difference becomes a preselected maximum. Thus the present invention eliminates the need for the operator to effect such lock-up operations while conducting other operations in the use of the vehicle.

The invention is disclosed in connection with a loader-type earthworking vehicle. As will be obvious to those skilled in the art, the invention may be utilized in effecting lock-up of an interaxle differential with other types of apparatus such as rear engine scrapers and the like wherein power adjustment occurs between the front and rear axles with the invention effecting an automatic balance of the front and rear rim pull so as to match steady state weight distribution in such scrapers. Similarly, the invention may be utilized in compactors where large forces are generated in the soil being compacted and which are directed tangentially to the compactor wheels. The use of the interaxle differential reduces such tangential forces and adjusts the forces to provide proper locomotion of the vehicle.

The invention comprehends means for sensing a deflection of one of the axles relative to the frame of the vehicle for providing a control signal to the interaxle differential for effecting lock-up thereof upon the deflection reaching a preselected maximum deflection.

The control means may include a shaft mounted to the vehicle to be rotated as a result of deflection of one axle and means for controlling the differential as a function of rotational disposition of that shaft.

The control means may use a mechanical linkage between the rotatable shaft and the lock-up means or may utilize a hydraulically operable connection therebetween as desired.

The connecting means may include means for multiplying the rotational movement of the shaft to permit control of the interaxle differential with a small amount of rotational movement of the shaft effected by the deflection of the axle.

The apparatus may include means for limiting the deflection of the deflectible axle beyond the preselected maximum deflection.

The signal multiplying means may comprise a crank arm connected to the shaft. The portion of the axle support connected to the shaft may be resilient so as to effectively define a spring connection therebetween providing the desired rotation of the control shaft.

The deflectible axle may be carried by a beam having opposite ends rotatably carried by the vehicle frame with one end being connected to the lock-up means of the interaxle differential.

The beam may taper towards the ends thereof to provide controlled deflection in sensibly rotating one end for operation of the lock-up means.

In broad aspect, the invention comprehends providing a flexing means associated with one axle of a vehicle for translating a deflection of that axle into a linear movement suitable to activate a differential lock mechanism such as a lock mechanism of an interaxle differential mechanism.

BRIEF DESCRIPTION OF DRAWINGS

FIG. 1 is a side elevation of a vehicle having a wheel drive embodying the invention;

FIG. 2 is a fragmentary bottom plan view of the vehicle illustrating the mounting of one of the wheel axles on the frame of the vehicle;

FIG. 3 is a fragmentary schematic illustration of the connection of the control means to the lock-out lever of the interaxle differential mechanism of the vehicle;

BEST MODE FOR CARRYING OUT THE INVENTION

Figure 4:
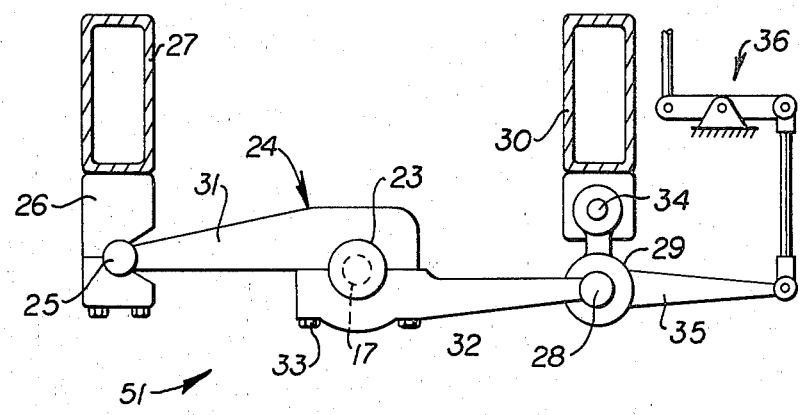
FIG. 4 is a fragmentary section taken substantially along the line IV—IV in FIG. 3 and illustrating one embodiment of the axle deflection sensing means of the invention.

In the exemplary embodiment of the invention as disclosed in FIGS. 1-4 of the drawing, a vehicle generally designated 10 is shown in the form of a loader having front wheels 11 and rear wheels 12. The loader may include a conventional drive engine 13 connected through a transmission 14' and an interaxle differential 14 to a drive shaft 15 for driving the front wheels 11 through a front differential 16. The differential 14 may be connected through a second drive shaft 17 connected to a rear differential and axle housing 18 for driving the rear wheels 12.

The vehicle may include a conventional cab 19 defining an operator station. Earthworking means such as a bucket 20 may be provided on the front end of the vehicle and the operation of the bucket being effected through suitable mechanism 21 under the control of the operator from the cab 19.

The present invention is concerned with minimizing wear of the tires of the wheels 11 and 12 by eliminating wheel fight by means of a geometrically torque-biased interaxle differential 14. The invention comprehends providing means for automatically locking up the differential when the load applied to the axles of the front and rear wheels respectively reaches a preselected maximum load differential. The invention provides improvements for effecting the lock-up operation automatically thereby freeing the operator for tending to other functions in the operation of the vehicle.

In the illustrated embodiment, the automatic control means is illustratively shown associated with the rear wheel axle. As shown in FIG. 2, the axle housing 18 is carried on trunnion supports 23 and 23'. The trunnion support 23 is provided as a portion of a beam assembly generally designated 24 as seen in FIG. 4. One end 25 of the beam assembly is movably carried by a support 26 mounted to a first frame member 27. The opposite end 28 of the beam assembly is rotatably mounted to a link 29 carried by a second frame member 30.

As shown in FIG. 4, the beam assembly 24 includes first and second portions 31 and 32, respectively, secured together about the trunnion support 23 by suitable securing means such as bolts 33. The ends of the beam portions 31 and 32 may be tapered so as to provide a flexible connection to the frame members 27 and 30. Further, the swinging of link 29 about its axis 34 accommodates the swinging movement of beam end 28 about the drive shaft 17.

A crank arm 35 may be connected to beam end 28. A linkage, generally designated 36, may be connected to the crank arm for providing a signal to a lock-out lever 37 (see FIG. 3) of the interaxle differential mechanism 14. The crank arm and linkage are usable to multiply the rotational movement of the shaft 28 for locking the differential in response to a small rotational movement of the shaft.

As shown in FIG. 3, the connection between linkage 36 and lock-up lever 37, may comprise a hydraulic connection, generally designated 38. More specifically, the hydraulic connection 38 may include a spool valve 39 having a movable valve member 40 connected to linkage 36 by a valve stem 41. A hydraulic fluid pump 42 may be connected through a reservoir 43 and in fluid communication with the spool valve 39 for selectively providing pressurized hydraulic fluid through a transfer line 44 to a piston cylinder 45 having a piston 46 contained therein and spring biased by a suitable coil spring 47 against the fluid pressure from pump 42. The piston 46 may be provided with a piston rod 48 connected to the lock-out lever by a suitable connector 49.

If desired, a direct mechanical connection from arm 35 may be utilized in lieu of the linkage 36 and hydraulic connection 38. Such direct connection is identified as 35' in FIG. 3.

Figure 5:
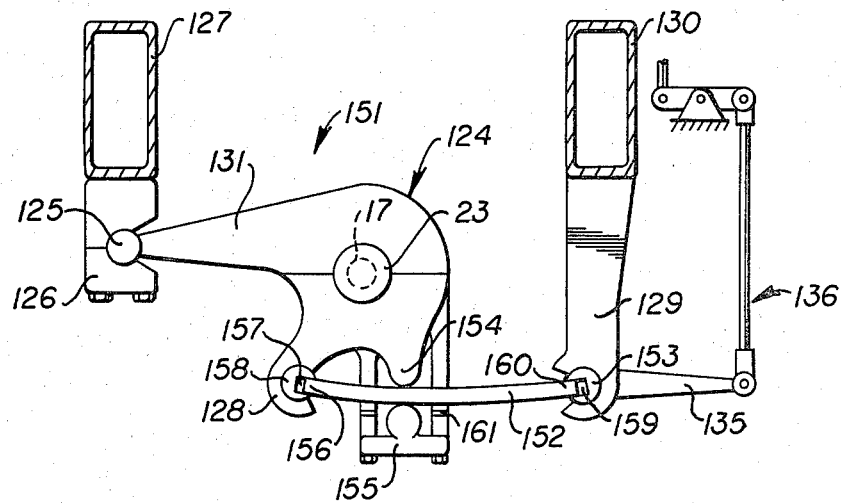
FIG. 5 is a fragmentary section similar to FIG. 4 but illustrating another embodiment of the deflection means of the invention.

Referring now to the embodiment of FIG. 5, a modified form of lock-out control, generally designated 151, is shown to comprise a control generally similar to control 51, but utilizing a modified form of beam structure. More specifically, a beam assembly 124, as shown in FIG. 5, includes a first portion 131 pivotally mounted to the trunnion support 23, and having one end 125 defining a ball joint connection mounted to a support member 126 carried by the frame member 127.

End 128 of beam assembly 124 is connected through a spring 152 to a connection 153 rotatably mounted in a support 129 carried by the other frame member 130. Beam assembly 124 further includes a deflecting portion 154 which bears against the mid-portion of the spring 152 so as to effect a deflection thereof as a result of vertical movement of the trunnion support 23 carrying the drive shaft 17.

The maximum deflection of the trunnion support may be limited by a stop 155 against which the spring 152 is urged by the deflecting portion 154 as shown in FIG. 5.

Connection 153 may be provided with a crank arm 135 which may be connected through a suitable linkage 136 to the lock-out lever 37 of the interaxle differential 14 either through a mechanical connection or hydraulic connection as discussed above relative to the control 51. Said crank arm and linkage are also usable to multiply the rotational movement of the connection 153, as previously discussed.

The left-hand end 156 of spring 152 may be received in a suitable slot 157 of a shaft 158 rotatably carried in the beam end 128. Similarly, a connection 153 may be provided with a slot 159 for receiving the opposite end 160 of the spring 152. Thus, movement of the spring ends in the slots 157 and 159 accommodates the translation of the spring ends resulting from the deflection thereof by the difference in load applied to the vehicle axles.

As will be obvious to those skilled in the art, the connections 153 and 158 of the beam and spring ends, as shown in FIG. 5, may be ball joint (or shaft) connections within the scope of the invention.

Adjustment of the stop 155 may be effected through the use of suitable conventional shims 161, as shown in FIG. 5.

Spring 152 may comprise a leaf spring. Thus, the spring functions similarly to the tapered ends of the beam assembly 24 of the lock-out control 51 in providing improved control flexibility of the beam assembly in providing the desired deflection signal to a lock-out means of the interaxle differential 14.

Thus, control 151 is similar to and functions similarly to control 51 in providing an automatic operation of the lock-out means of the interaxle differential 14 as a result of sensing a deflection of one of the wheel axles of the vehicle. The deflectible support for the axle trunnion housing provides a facilitated low-cost means for providing this necessary signal to effect such automatic operation. As discussed above, the transmission of the signal to the lock-out lever may be effected by mechanical or fluid-operated means as desired. The resilient deflectibility of the trunnion support mounting beam and the use of the crank arm connected to the interconnecting linkage provides improved positive means for providing a sensible signal for use in controlling the disposition of the lock-out lever as discussed above.

INDUSTRIAL APPLICABILITY

In the use of the vehicle, a load (designated L in FIGS. 4 and 5) on the rear axle 18, for example, is carried through the trunnion supports 23, 23' to said axle. In normal operation, the control means 51 or 151 is not sufficiently deflectible to cause the differential 14 to be locked out. However, when the bucket is used to pick up sufficient amounts of material, for example, the rear wheels are "unloaded" and tend to lift off the ground, thereby losing traction. This generally causes all the driving torque to be delivered to the spinning rear wheels, as is known. The lifting effect causes deflection of the control means 51 or 151 which, when sufficient, locks the interaxle differential to substantially deliver the driving torque to the front axle.

Once a deflection of the axle 22 occurs which is sufficient to rotate the beam end 28 and crank arm 35 connected thereto and to cause linkage 36 to position valve member 40 to connect pump 42 in fluid communication with cylinder 45, piston 46 is moved to the right as seen in FIG. 3 so as to swing lock-out lever 37 suitably to lock-out the interaxle differential 14. The mechanical linkage 50 similarly controls the parameters of the flexibility of the beam 24, crank arm 35 and linkage 36 may be suitably preselected to provide operation of the lockout means when the deflection of the axle 22 reaches a preselected maximum deflection. For example, tapering the beam assembly ends provides a controlled deflection of said beam assembly to sensibly rotate the beam end 28 for facilitated control of the locking means 37.

Thus, the differential lock-out control, generally designated 51, as shown in FIG. 4, provides an improved automatic operation of the lock-out means of the interaxle differential without requiring the user of the vehicle to manually effect such lock-out operation. The lock-out is effected by sensing the deflection of one of the axles of the vehicle so as to provide a control signal through suitable interconnecting means to effect automatic operation of the lock-out means of the interaxle differential. The interconnection may be mechanical or fluid operated as desired. Deflection magnifying means may be provided in the form of a crank arm or other suitable mechanism as desired to facilitate the transmission of the desired control signal.

I claim:

1. In a vehicle (10) having a frame (27,30;127,130), an engine (13) carried by the frame, a first wheeled axle (22), a second wheeled axle (22'), and means including a differential (14) for differentially driving said axles from said engine, the improvement comprising
control means (51,151) connected to said differential and comprising means responsive to a deflection of one of said axles for locking said differential as a result of said deflection becoming a preselected deflection.

2. In a vehicle (10) having a frame (27,30;127,130), an engine (13) carried by the frame, a first wheeled axle (22), a second wheeled axle (22'), and means including a differential (14) for differentially driving said axles from said engine, the improvement comprising
control means (51,151) responsive to a load applied to one of said axles for locking said differential as a result of said load becoming a preselected load, said control means comprising means responsive to deflection of said one of said axles (22,22') for transmitting a control signal to said differential (14) to effect said locking thereof.

3. The vehicle structure of claim 2 wherein means (155) is provided for limiting the deflection of said one of the axles beyond said preselected maximum deflection.

4. In a vehicle (10) having a frame (27,30;127,130), an engine (13) carried by the frame, a first wheeled axle (22), a second wheeled axle (22'), and means including a differential (14) for differentially driving said axles from said engine, the improvement comprising
control means (51,151) responsive to a load applied to one of said axles for locking said differential as a result of said load becoming a preselected load, said control means comprising means including a shaft (28,153) mounted to the vehicle (10) to be rotated as a result of deflection of one of said axles (22,22'), and means 35,36,38,49,50,37 and 135,136,38,49,50,37) for controlling said differential (14) as a function of the rotational disposition of said shaft (28,153).

5. The vehicle structure of claim 4 wherein said means (38) for controlling said differential (14) as a function of the rotational disposition of said shaft (28,153) comprises hydraulically operable means.

6. The vehicle structure of claim 4 wherein said means for controlling said differential (14) as a function of the rotational disposition of said shaft (28,153) comprises a mechanical linkage (50) connected between said shaft and differential.

7. The vehicle structure of claim 4 wherein said means for controlling said differential (14) as a function of the rotational disposition of said shaft (28,153) comprises a mechanical linkage (50) connected between said shaft and differential, said mechanical linkage (50) including means (35,36 and 135,136) for multiplying the rotational movement of the shaft (28,153).

8. The vehicle structure of claim 3 including a crank arm (135) connected to said shaft and of a construction sufficient for limiting the deflection of said one of the axles beyond said preselected maximum deflection.

9. In a vehicle (10) having a frame (27,30;127,130), an engine (13) carried by the frame, a first wheeled axle (22), a second wheeled axle (22'), and means including a differential (14) for differentially driving said axles from said engine, the improvement comprising
control means (51,151) responsive to a load applied to one of said axles for locking said differential as a result of said load becoming a preselected load, said control means including deflectible means (24,125,152) carried by the frame (27,30) and supporting said one of the axles (22,22'), and means (32,28,35,36,38,50,37 and 152,153,135,136,38,50,37) for sensing the deflection of the deflectible means caused by the difference in the loads applied to the axles.

10. In a vehicle (10) having a frame (27,30;127,130), an engine (13) carried by the frame, a first wheeled axle (22), a second wheeled axle (22'), and means including a differential (14) for differentially driving said axles from said engine, the improvement comprising
control means (51,151) responsive to a load applied to one of said axles for locking said differential as a result of said load becoming a preselected load, said control means (51,151) including a deflection beam (24,124) having end portions movably carried by the frame, said beam having a midportion supporting said one of the axles (22, 22'), said control means further including means for sensing the deflection of the beam (24,124) caused by the load applied to said one of the axles.

11. In a vehicle (10) having a frame (27,30;127,130), an engine (13) carried by the frame, a first wheeled axle (22), a second wheeled axle (22'), and means including a differential (14) for differentially driving said axles from said engine, the improvement comprising
control means (51,151) responsive to a load applied to one of said axles for locking said differential as a result of said load becoming a preselected load, said control means (51,151) including a deflectible portion (31,32,152) of an axle support positioned at a location sufficient for supporting said one of the axles on the frame.

12. In a vehicle (10) having a frame having first (127) and second (130) portions, an engine (13) carried by the frame, a first wheeled axle (22), a second wheeled axle (22'), and a differential (14) for differentially driving said axles from said engine, the improvement comprising:
a trunnion support (23,23') positioned at a location sufficient for supporting one of said axles (22,22');
means (124) for mounting the trunnion to the first portion (127) of the frame;

a connection (153) pivotally mounted to said second portion (130) of the frame and pivotally movable in response to a difference in the loads applied to said axles;

a spring (152) having one portion (156) connected to the trunnion (23) and a second portion (160) connected to said connection (153); and connecting means (136,38,50,49,37) for locking said differential as an incident of said connection (153) pivoting to a preselected maximum as a result of the load applied to one of said axles becoming a preselected load.

13. The vehicle drive of claim 12 wherein said trunnion (23,23') is connected to said frame portions by ball joint connections (125,153).

14. The vehicle drive of claim 12 wherein said trunnion mounting means (124) is provided with a rotatable shaft (158) and said spring (152) is connected to said trunnion through said shaft.

15. The vehicle drive of claim 12 including a crank arm (135) connected to said connection (153), and said connecting means (136,38,50,49,37) is positioned between said crank arm (135) and said differential (14).

16. The vehicle drive of claim 12 including a crank arm (135) connected to said connection (153) and a mechanical linkage (50) connected between said crank arm (135) and said differential (14).

17. The vehicle drive of claim 12 including a crank arm (135) connected to said connection (153), and said connecting means (136,38,50,49,37) comprises hydraulic control means (38) connected between said crank arm (135) and said differential (14).

18. In a vehicle (10) having a frame having first (27) and second (30) portions, an engine (13) carried by the frame, a first wheeled axle (22), a second wheeled axle (22'), and a differential (14) for differentially driving said axles from said engine, the improvement comprising:

a beam assembly (24) having opposite ends (25,28) rotatively carried by said portions (27,30) of said frame and a midportion (23) journaling one of said axles (22); and locking means (37) connected to one of said beam ends for locking said differential as an incident of said one beam end rotating to a preselected maximum as a result of the load applied to one of said axles becoming preselected load.

19. The vehicle structure of claim 18 wherein said beam assembly (24) tapers toward said ends.

20. The vehicle structure of claim 18 wherein a link (29) is swingably connected to said frame portion (30) and said one of the ends of the beam (25,28) is rotatively connected to said link (29).

21. The vehicle structure of claim 18 including a crank arm (35) connected to said one of the ends of the beam (25,28), and connecting means (36,38,50,49,37) positioned between said crank arm (35) and said differential (14).

* * * * *